United States Patent [19]
Nakano

[11] Patent Number: 6,151,642
[45] Date of Patent: *Nov. 21, 2000

[54] SYSTEM FOR DMA DATA RECEPTION CAPABLE OF CONFIRMING THE CONTENT OF A RECEIVED DATA EVEN IF THE RECEIVED DATA IS LESS THAN A PRESET LENGTH

[75] Inventor: Takeaki Nakano, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/024,866

[22] Filed: Feb. 17, 1998

[30] Foreign Application Priority Data

Feb. 17, 1997 [JP] Japan ................................ 9-032120

[51] Int. Cl.⁷ .................................................. G06F 13/14
[52] U.S. Cl. ............................ 710/22; 709/231; 709/236; 709/250
[58] Field of Search .................................... 709/236, 231, 709/250; 710/22, 48

[56] References Cited

U.S. PATENT DOCUMENTS

| 4,502,117 | 2/1985 | Kihara | 710/28 |
| 5,386,532 | 1/1995 | Sodos | 710/22 |
| 5,412,782 | 5/1995 | Hausman et al. | 709/250 |
| 5,485,584 | 1/1996 | Hausman et al. | 710/22 |
| 5,872,920 | 2/1999 | Hausman et al. | 709/250 |
| 5,983,275 | 11/1999 | Ecclesine | 709/231 |

*Primary Examiner*—Thomas C. Lee
*Assistant Examiner*—Abdelmoniem Elamin
*Attorney, Agent, or Firm*—Fitzpatrick, Cella, Harper & Scinto

[57] ABSTRACT

There are provided a reception apparatus using direct memory access (DMA), a reception method and a memory medium, allowing one to confirm the content of the received data in the DMA data reception, even when the received data are shorter than a preset data length. In a DMA reception apparatus capable of making a request for an interruption to the MPU 1 in response to the reception of data of y bytes from the host computer, there is also made a setting of x bytes in addition to the setting of y bytes, in order to confirm the data content when the length of the data transmitted from the host computer is less than y bytes, and a request for interruption is made upon reception of data of x bytes from the host computer.

25 Claims, 4 Drawing Sheets

SYSTEM FOR DMA DATA RECEPTION CAPABLE OF CONFIRMING THE CONTENT OF A RECEIVED DATA EVEN IF THE RECEIVED DATA IS LESS THAN A PRESET LENGTH

BACKGROUND OF THE INVENTION

1. Field of the Invention

The present invention relates to a data reception apparatus utilizing direct memory access, a method and a memory medium therefor.

2. Related Background Art

In data reception based on the conventional direct memory access (hereinafter written as DMA), the data length to be received is set in advance, and an interruption request is made to the microprocessor unit (MPU) in a case of data reception of the preset data length.

In the conventional DMA data reception, since the data length to be received is set in advance and the interruption is requested from the MPU only in a case of data reception of the preset data length as explained above, interruption cannot be requested in a case of reception of data which are less than the preset data length.

SUMMARY OF THE INVENTION

In consideration of the foregoing, the object of the present invention is to provide a reception apparatus utilizing direct memory access, capable, in the DMA data reception, of confirming the content of the received data even in the case of reception of data less than the preset data length, and a method and a memory medium therefor.

The above-mentioned object can be attained, according to the present invention, by a data reception apparatus based on direct memory access, of the following configuration (1), or by a data reception method based on direct memory access with the following configuration (2), or by a memory medium with the following configuration (3):

(1) A data reception apparatus using, and direct memory access, comprising connector means for connection to a host computer; receiver means for receiving data transmitted from the host computer; transfer means for transferring the received data to a preset address of a random access memory; setting means for setting a reception data length; first interruption requesting means for requesting an interruption to the MPU in case of reception of the data of a first data length set by the setting means; second interruption requesting means for requesting an interruption to the MPU in case of reception of the data of a second data length set by the setting means and less than the first data length; and discriminator means for discriminating the received data;

(2) A data reception method for a data reception apparatus using direct memory access, comprising a step of setting a first data length to be received; a step of setting a second data length to be received, shorter than the first data length; a step of requesting an interruption to the MPU in case of reception of the data of the first data length; and a step of requesting an interruption to the MPU in case of reception of the data of the second data length;

(3) A memory medium storing a program for realizing the data reception method by direct memory access according to (2).

DESCRIPTION OF THE PREFERRED EMBODIMENTS

Now the present invention will be clarified in detail by description of an embodiment of the data reception apparatus using direct memory access. In addition to such data reception apparatus, the present invention may also be realized by a data reception method by direct memory access or a memory medium storing a program for realizing such method.

Figure 1:
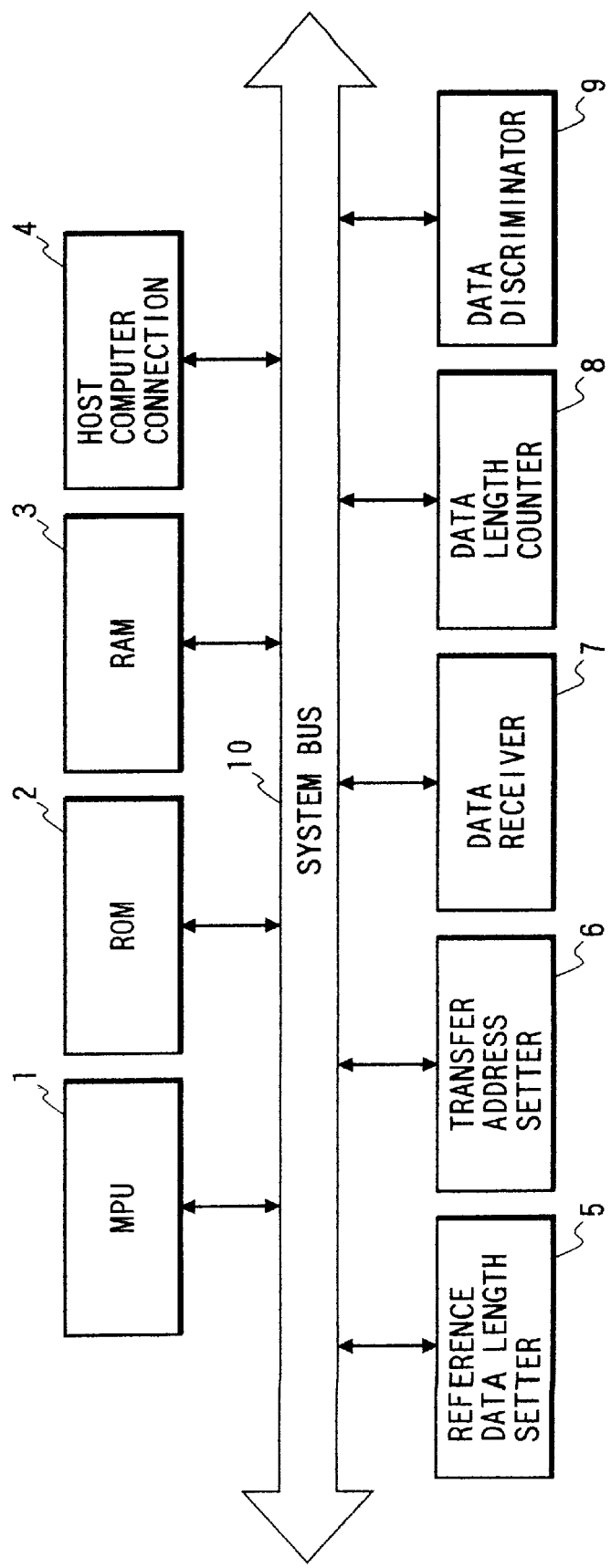
FIG. 1 is a block diagram of an embodiment of the present invention.

FIG. 1 is a block diagram of a data reception apparatus by direct memory access, constituting an embodiment of the present invention.

A microprocessor unit (MPU) 1 controls the entire reception apparatus according to a program stored in a read-only memory (ROM) 2. A random access memory (RAM) 3 is used as a work area for the MPU 1 and a memory area for the received data. A host computer connection unit 4 executes control required for the data exchange with a host computer. A reference data length setter unit 5 sets a reference length for the data transmitted from the host computer. A transfer address setter unit 6 sets a transfer address, required for the transfer of the received data to the RAM 3. A data receiver unit 7 receives the data from the host computer and transfers the received data in succession to the RAM 3, starting from the address set by the transfer address setter unit 6. A data length counter unit 8 counts the length of the received data and requests an interruption to the MPU 1 in case the counted length reaches the reference length set by the reference length setter unit 5. A data discriminator unit 9 discriminates the received data. A system bus 10 connects the components mentioned above.

Figure 2:
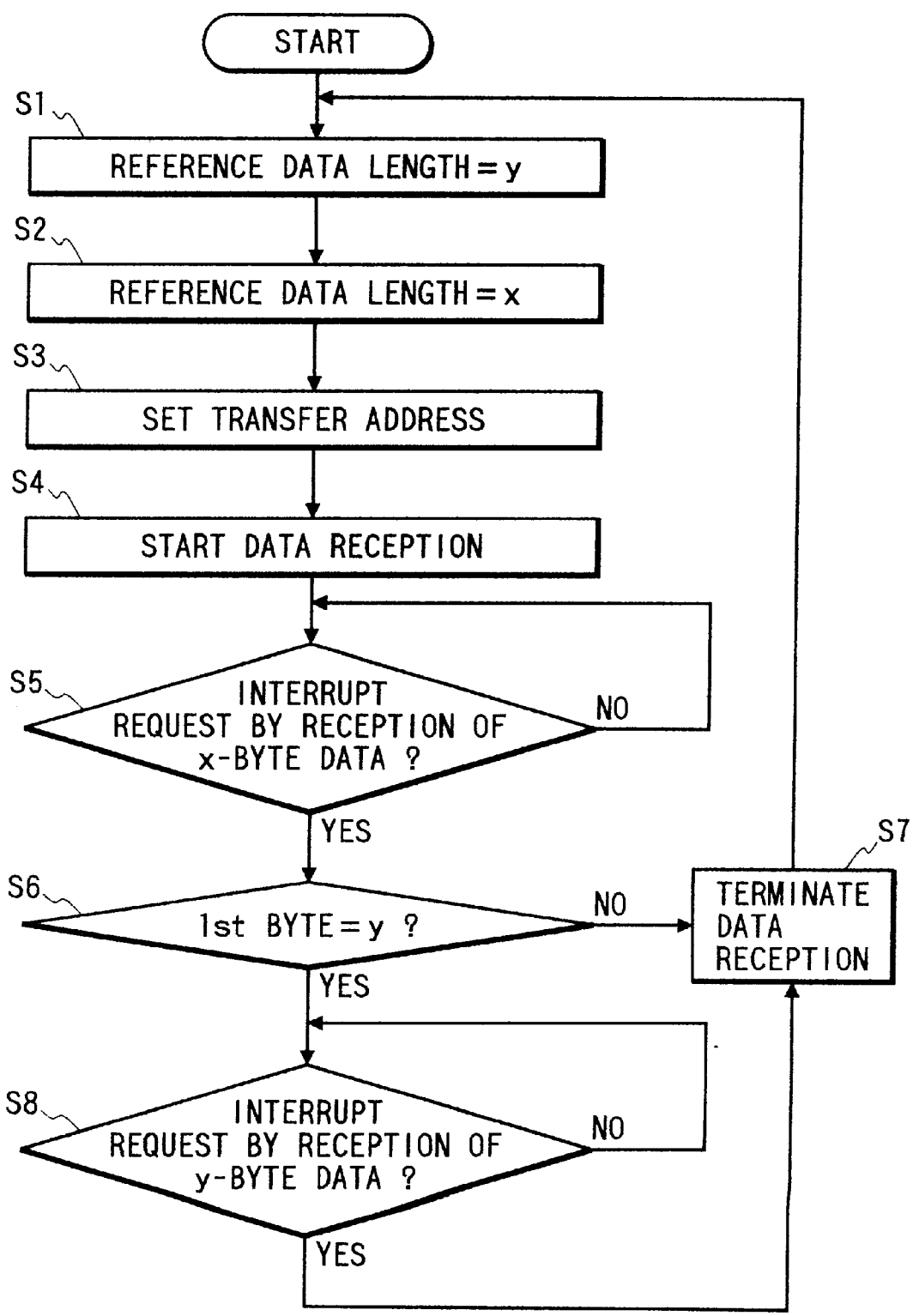
FIG. 2 is a flow chart showing a receiving operation.

The receiving operation of the present reception apparatus of the above-explained configuration will be explained with reference to a flow chart shown in FIG. 2. The sequence in this flow chart is realized by the execution of a program, stored in the ROM 2, by the MPU 1.

As an example, there is explained a receiving operation of the present reception apparatus in case of reception of data of a data length of y bytes from the host computer. It is assumed that the minimum length of the data transmitted from the host computer is x, and the first byte of the data contains the length thereof, such as x or y.

At first a step S1 sets that an interruption is requested to the MPU 1 in case of data reception of y bytes from the host computer. Also a step S2 sets, for confirming the content of the data in the course of reception thereof, that an interruption request is made to the MPU 1 in a case of data reception of x bytes from the host computer. Then a step S3 sets an address of the RAM 3 for transferring the received data, and a step S4 starts the data reception. A step S5 awaits the request for interruption by the reception of x bytes. When data of x bytes are received from the host computer, a request for the interruption is made to the MPU 1, whereby the sequence proceeds to step S6, which discriminates the first byte of the received data. If the first byte is not a value indicating y, a step S7 terminates the reception and the sequence returns to the step S1. If the first byte is a value indicating y, the sequence proceeds to a step S8, which awaits the request for interruption by the reception of y bytes. When the request for interruption is made on the reception of y bytes, the step S7 terminates the reception and the sequence returns to the step S1.

According to the present embodiment, as explained in the foregoing, an interruption request is made to the MPU even in case the received data are less than the preset y bytes, thereby enabling to confirm the content of the received data.

As explained in the foregoing, the present invention enables, in the DMA data reception from the host computer, to request an interruption to the MPU and to confirm the content of the received data even in case of reception of data less than the preset data length, thereby enabling prompt response in the succeeding data reception in case the data to be received are lost by a certain hindrance in the course of data communication.

Figure 3:
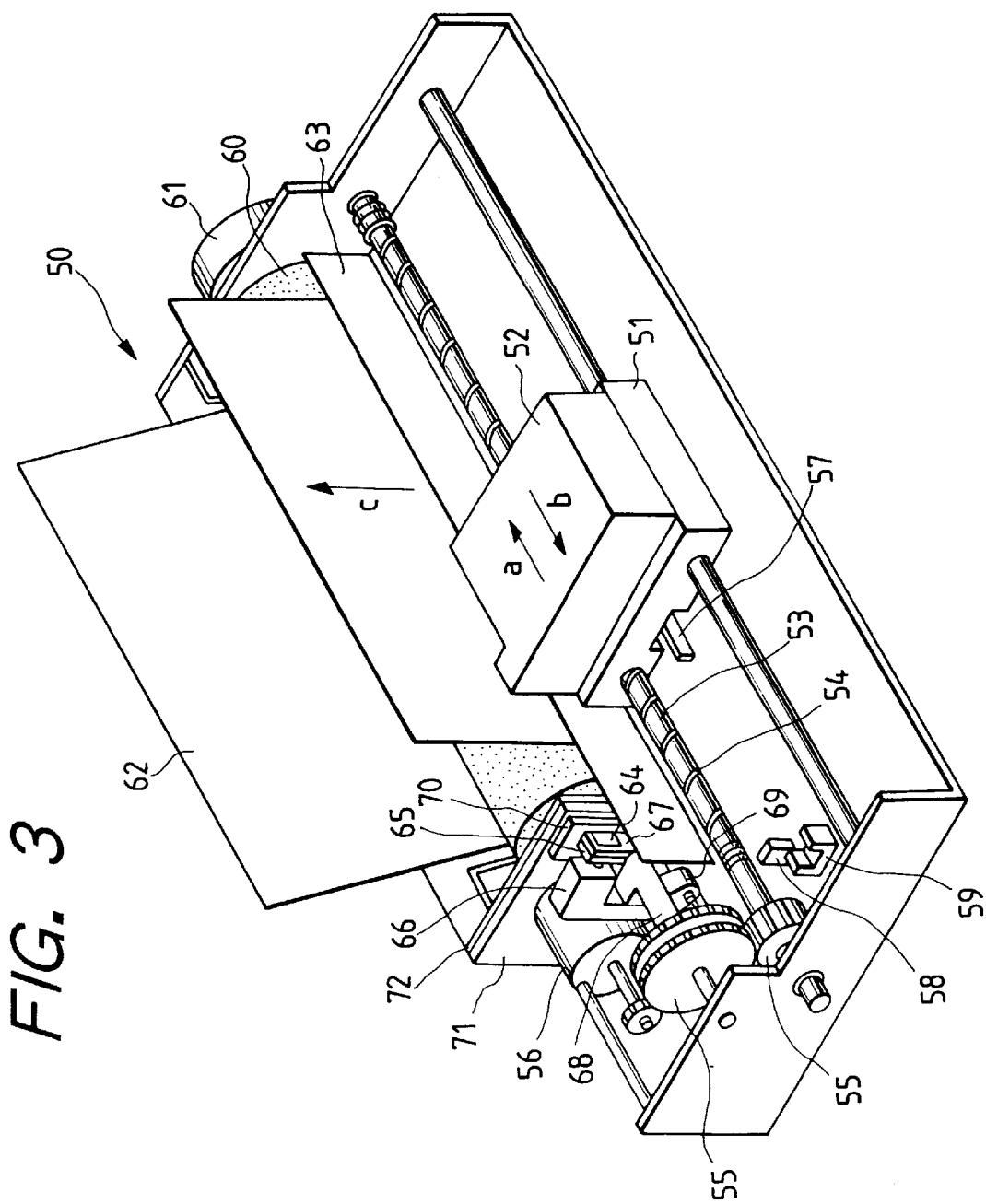
FIG. 3 is a perspective view showing the internal structure of an ink jet printer.

FIG. 3 is a perspective view showing the internal structure of an ink jet printer constituting an output device in which the present invention is applicable.

In the ink jet printer 50, a carriage 51 supports an ink jet cartridge 52 and engages, by an unrepresented pin, with a spiral groove 54 of a lead screw 53, which is coupled with a carriage motor 56 through plural sprockets 55, whereby the carriage 51 is moved in a direction a or b, respectively by forward or reverse rotation of the carriage motor 56. Under the carriage 51 there is provided a lever 57, of which position is detected by a photocoupler 58, 59 which serve to determine that the carriage 51 is at a home position. The rotating direction of the carriage motor 56 is switched when the carriage 51 is detected to be at the home position.

A platen 60 is connected to a paper feed motor 61, by which a recording sheet 62 supported by the platen 60 is transported in a direction c. A paper pressing plate 63 presses the recording sheet 62 toward the platen 60 over the entire moving range of the carriage 51.

A cap member 64, capping the entire face of the recording head, is supported by a support member 65. Suction means 66 executes the suction of the recording head through an aperture 67 therein. A suction lever 68, for starting the sucking operation, is moved by the movement of a cam 69 engaging with the carriage 51, and is controlled by the driving force from the carriage motor 56 through known transmission means such as a clutch. A cleaning blade 70 is rendered movable forward and backward by a member 71, and a main support member 72 supports the cleaning blade 70 and the member 71.

Figure 4:
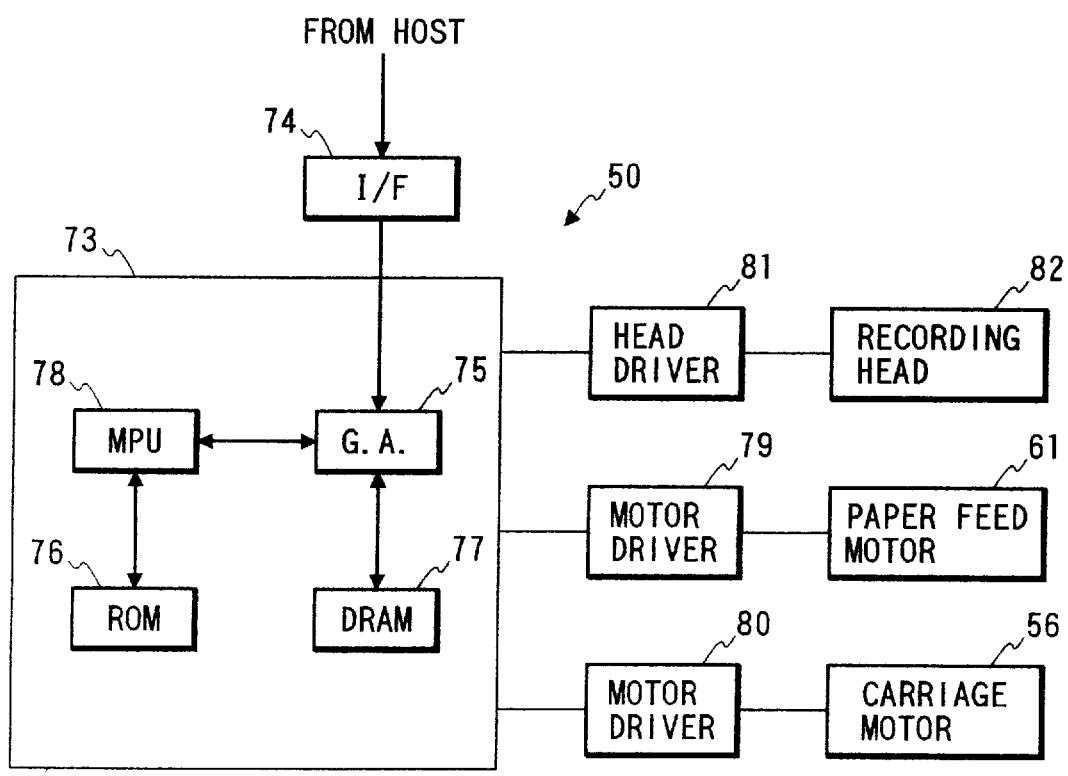
FIG. 4 is a block diagram of the ink jet printer.

FIG. 4 is a block diagram of the ink jet printer shown in FIG. 3, wherein a control system 73 for the ink jet printer 50 is provided with a gate array 75 for controlling the information exchange with the host computer through an interface 74, a ROM 76 for storing font data, text processing programs and various information used in the host computer, a DRAM 77 for storing the input information and serving as a work area, and an MPU 78 for controlling the above-mentioned components. The MPU 78 is rendered capable of communication with the host computer through the interface 74, whereby the data and the resource information memorized in the DRAM 77 and the print information stored in the ROM 76 can be transmitted to the host computer. The interface 74 corresponds to the host computer connection unit 4 shown in FIG. 1.

In the ink jet printer 50 of the above-explained configuration, the input information from the host computer connected to a predetermined communication network is supplied, through the interface 74, to the gate array 75 and is converted into output information under the control of the MPU 78. The paper feed motor 61 and the carriage motor 56 are respectively driven through motor drivers 79, 80 and the output information is transferred to a head driver 81 which drives a recording head 82, whereby the printing operation is executed.

What is claimed is:

1. A data reception apparatus comprising:
   a receiver arranged to receive, from a host computer, data for printing by direct memory access (DMA) reception;
   a data transfer unit that transfers the received data to a preset address of a random access memory;
   a reference data length setter which sets first and second reference data lengths, the second reference data length being shorter than the first reference data length;
   a first-interruption requester that makes an interruption request to a microprocessor unit (MPU) upon reception of data of the first reference data length set by said setter;
   a second-interruption requester that makes an interruption request to the microprocessor unit upon reception of data of the second reference data length set by said setter; and
   a discriminator that discriminates the received data.

2. A data reception method comprising the steps of:
   setting a first reference data length;
   setting a second reference data length shorter than the first reference data length;
   making an interruption request to a microprocessor unit (MPU) upon DMA reception of data for printing having the first reference data length; and
   making an interruption request to the microprocessor unit upon reception of data of the second reference data length.

3. An apparatus according to claim 1, wherein said apparatus is a printer.

4. An apparatus according to claim 3, wherein the printer is an ink jet printer.

5. An apparatus according to claim 3, wherein the printer comprises a memory for storing font data.

6. An apparatus according to claim 3, wherein the printer comprises a memory for storing resource information.

7. A method according to claim 2, wherein said method is applicable to a printer.

8. A method according to claim 7, wherein the printer is an ink jet printer.

9. A method according to claim 7, wherein the printer comprises a memory for storing font data.

10. A method according to claim 7, wherein the printer comprises a memory for storing resource information.

11. A data reception program product including computer executable instructions for performing the steps of:
    setting a first reference data length;
    setting a second reference data length;
    making an interruption request to a microprocessor unit (MPU) upon DMA reception of data for printing having the first reference data length; and
    making an interruption request to the microprocessor unit upon the reception of data of the second reference data length.

12. A program product according to claim 11, wherein said program is applicable to printer.

13. A program product according to claim 12, wherein the printer is an ink jet printer.

14. A program product according to claim 12, wherein the printer comprises a memory for storing font data.

15. A program product according to claim 12, wherein the printer comprises a memory for storing resource information.

16. A computer-readable memory medium that stores a data reception program, wherein the program comprises the steps of:

setting a first reference data length;

setting a second reference data length shorter than the first reference data length;

making an interruption request to a microprocessor unit (MPU) upon DMA reception of data for printing having the first reference data length; and making an interruption request to the microprocessor unit upon reception of data of the second reference data length.

17. A medium according to claim 16, wherein the program is applicable to a printer.

18. A medium according to claim 17, wherein the printer is an ink jet printer.

19. A medium according to claim 17, wherein the printer comprises a memory for storing font data.

20. A medium according to claim 17, wherein the printer comprises a memory for storing resources information.

21. A system comprising a host computer and a data reception apparatus, wherein said data reception apparatus comprises:

a receiver arranged to receive, from said host computer, data for printing by direct memory access (DMA) reception;

a data transfer unit that transfers the received data to a preset address of a random access memory;

a reference data length setter which sets first and second reference data lengths, the second reference data length being shorter than the first reference data length;

a first-interruption requester that makes an interruption request to a microprocessor unit (MPU) upon reception of data of the first reference data length set by said setter;

a second-interruption requester that makes an interruption request to the microprocessor unit upon reception of data of the second reference data length set by said setter; and a discriminator that discriminates the received data.

22. A system according to claim 21, wherein said data reception apparatus is a printer.

23. A system according to claim 22, wherein the printer is an ink jet printer.

24. A system according to claim 22, wherein the printer comprises a memory for storing font data.

25. A system according to claim 22, wherein the printer comprises a memory for storing resource information.

* * * * *

UNITED STATES PATENT AND TRADEMARK OFFICE
CERTIFICATE OF CORRECTION

PATENT NO. : 6,151,642
DATED : November 21, 2000
INVENTOR(S) : Takeaki Nakano

It is certified that error appears in the above-identified patent and that said Letters Patent is hereby corrected as shown below:

Column 1,
Line 10, "a method" should read -- and to a method --; and
Line 15, "DMA)," should read -- "DMA"), --.

Column 4,
Line 49, "length;" should read -- length shorter than the first reference data length; -- ; and
Line 57, "to" should read -- to a --.

Column 5,
Line 17, "resources" should read -- resource --.

Signed and Sealed this

Sixth Day of November, 2001

Attest:

*Nicholas P. Godici*

NICHOLAS P. GODICI
*Attesting Officer*  *Acting Director of the United States Patent and Trademark Office*